H. F. WHEELER.
Assignor by mesne Assignments to De WITT C. FARRINGTON.
MAGAZINE FIRE-ARMS.
No. 7,405. Reissued Nov. 28, 1876.
Fig. D.
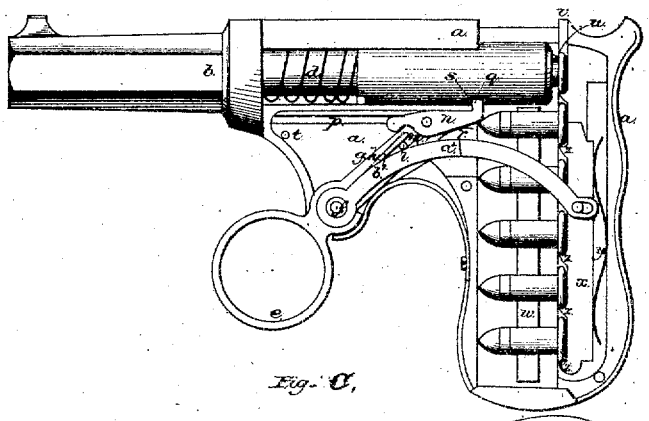
Fig. C.
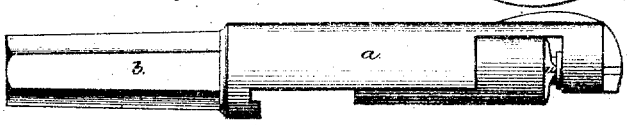
Fig. B.
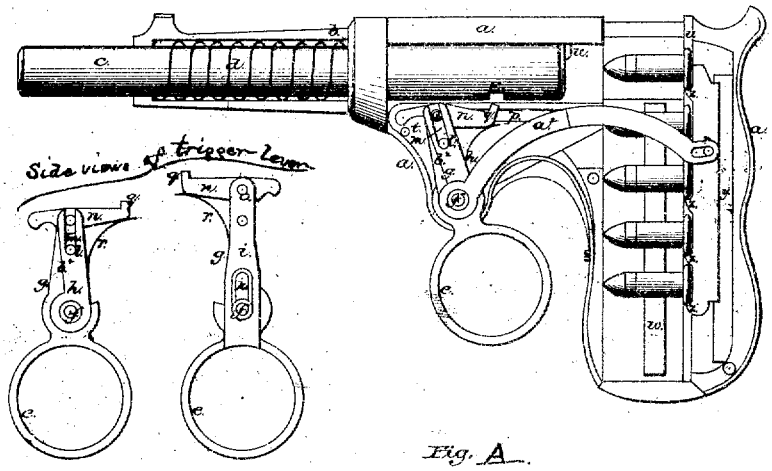
Fig. A.
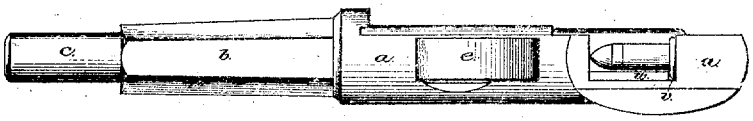
Attest: Geo. H. Fox, E. Adams
Inventor: Henry F. Wheeler

UNITED STATES PATENT OFFICE.

HENRY F. WHEELER, OF BOSTON, MASSACHUSETTS, ASSIGNOR, BY MESNE ASSIGNMENTS, TO DE WITT C. FARRINGTON.

IMPROVEMENT IN MAGAZINE FIRE-ARMS.

Specification forming part of Letters Patent No. 66,110, dated June 25, 1867; reissue No. 7,405, dated November 28, 1876; application filed October 19, 1876.

*To all whom it may concern:*

Be it known that I, H. F. WHEELER, of Boston, in the county of Suffolk and State of Massachusetts, have invented an Improved Breech-Loading Pistol; and I do hereby declare that the following, taken in connection with the drawings which accompany and form part of this specification, is a description of my invention sufficient to enable those skilled in the art to practice it.

On the 7th of February, 1865, Letters Patent No. 46,286 were granted to me for an improved breech-loading pistol. In such pistol there is shown a cartridge-magazine arranged within the stock, frame, or handle of the pistol, with mechanism by which, as one cartridge is fired and its shell removed, another cartridge is brought into position for firing, said pistol differing from all others then known to me in that a series of cartridges was contained within that part of the arm directly grasped by the hand in discharging the piece, each cartridge being in turn automatically brought into position to be fired.

My present invention relates principally to the construction of a magazine-pistol having this same general characteristic, or to an improvement upon such patented pistol, which improvement consists in the construction relating to containing and holding the cartridges in a magazine, and to feeding each in turn into position to be fired. There is also shown in such patented pistol, a sliding barrel, which by being driven back exploded the cartridge; and in my present invention, and forming part thereof, is an improvement in firing the cartridge by such rear movement of the barrel, the cartridge being held in position, and the barrel being driven against its flange, in contradistinction to first carrying the cartridge into the breech of the barrel, and then driving barrel and cartridge back, to fire the cartridge.

The drawings represent a magazine-pistol embodying the invention, letters A and B showing, respectively, a plan and a side view of the arm, with the barrel thrown out by the trigger, and C and D similar views, but showing the barrel driven back by its spring. In all the views the side plate covering the magazine and lock mechanism is removed to show the interior construction, and at B the tube in which the barrel slides is shown in section.

*a* denotes the frame of the pistol; *b*, the tube in which the barrel *c* is mounted and slides; *d*, the spring, expansion of which drives the barrel back to fire the cartridge. *e* denotes the trigger, hung on a pin, *f*, in the frame *a*. The trigger-lever *g* is composed of two parts or pieces, *h i*, one of which, *h*, is an extension from the trigger-ring *e*, (fixed relatively to the ring,) while the other, *i*, slides on this extension, having a slot, *k*, at or near its lower end, through which slot the pin *f* extends, and having, at or near its upper end, a pin, *l*, extending through a similar slot, *m*, in the piece *h*. At the upper end of the slide-piece *i* is a swinging dog, catch, or hook, *n*, hung on a pin, *o*, projecting from piece *i*, and through the piece *i* into a horizontal groove or slot, *p*, in the frame *a*. The rear end of this dog has a tooth, *q*, and this tooth, by the action of a spring, *r*, is held normally up to the lower surface of the barrel, the tooth slipping into a notch, *s*, in the barrel by the action of the spring, when the trigger-lever is thrown back, the catch *i* being kept horizontal in its rear movement by the presence of the pin *o* in the groove *p*, the slots in the pieces *h i* enabling the lever to elongate as it is pushed back.

When the piece is discharged by the rear movement of the barrel, and the trigger-lever is thrown back by forward throw of the trigger, the parts are in the position shown at D. By now drawing the trigger back, the tooth *q* drives the barrel forward against its spring *d*, and as the stress of this spring (from its compression by the barrel) increases, the length of the trigger-lever decreases, or its operating-point—namely, the tooth *q*—is brought nearer to the fulcrum *f*, thereby enabling the barrel to be moved with equal facility throughout all its movement, the acting arm of the lever shortening as the resistance of the spring increases. The barrel is moved forward by the action of the trigger-lever until the incline on the front end of the catch *n* strikes a pin, *t*, and thereby depresses the tooth $q$, as seen at B, and releases the barrel, which is driven back by the action of its spring.

The cartridge to be fired is not fed into the breech of the barrel, but is held in position opposite to and centrally in line with the barrel, as seen at B, and as the barrel flies back its movement carries it over the cartridge in such a manner that the cartridge shall then be contained within the barrel, or in position for firing.

The rear end of the barrel has a point or striker, $u$, which, when the barrel flies back, strikes the inner side of the cartridge-flange, exploding the fulminate contained therein and firing the cartridge. The cartridges are arranged within the frame, stock, or handle $a$ of the pistol, as seen at B and D, and the handle, for this purpose, is extended right-angularly, or approximately so, to the part of the frame in which the barrel slides, as seen at B and and D, and so that, by placing each cartridge horizontally therein and the several cartridges parallel to each other, as seen at B and D, each will, in turn, be brought opposite to the barrel, or in position for firing. The vertical chamber in which the cartridges are contained has, on one or both sides thereof, a groove, $v$, for receiving the cartridge-flange, keeping the cartridges from endwise movement, and for guiding them into line with the barrel; and it also has, on one or both side walls thereof, a strip of rubber or other friction-surface, $w$, for sustaining the cartridges in horizontal position as each is moved upward.

Just in rear of the groove or grooves $v$ is a vertical ratchet or toothed bar, $x$, placed centrally in line with the cartridges, and resting, at its rear side, against a spring, $y$, while on its front side or edge it has a series of teeth, $z$, the upper edge of each of which is horizontal, or a little hooking in shape, while each is inclined on its lower edge, as seen at B and D.

The cartridge-chamber is open at bottom for the insertion of the cartridges, which are pressed up into the chamber, and (when the chamber is filled) rest with the shell of one upon the top of each tooth, as seen at B and D, the toothed bar giving way against its spring as each cartridge, in filling the magazine, is pressed against the incline of the tooth. This bar is connected by a link, $a^2$, with the trigger-pin $f$, the trigger end of the link lying in a depression, $o^2$, in the trigger-lever. Supposing the cartridge shown at D as projecting from the end of the barrel to have been just exploded, as the trigger is next carried back, (impelling the barrel forward,) and near the last part of its back movement, the shoulder or wall forming the lower side of the recess $b^2$ strikes the link $a^2$ and forces it upward, and its upward movement carries with it the toothed bar $x$, and with it the series of cartridges, bringing the upper one into line with the barrel, as seen at B, and crowding the shell of the exploded cartridge out at the top of the chamber, this shell being detained as the barrel moves forward, by the groove in which its flange rests. The barrel springs back as the upper cartridge is brought into line with the barrel, and the rear movement of the trigger is completed, exploding the cartridge, as before explained. As the trigger is next carried forward by the finger, the shoulder or wall at the opposite side of the recess $b^2$ strikes the link $a^2$ and drives the bar $x$ downward, (the cartridge remaining stationary by the pressure of the rubber or friction surfaces,) allowing the lower inclined edges of the teeth to slip by the heads thereof, the downward movement of the bar being just sufficient to carry the respective teeth from the position of each under one cartridge-flange to a similar position under the one next below it, so that at each pull back of the trigger to fire the piece, the bar lifts a fresh cartridge into position until all are discharged.

It will be obvious that the specific construction and arrangement of the devices for operating the barrel, and for feeding cartridges into position, may be modified or varied; but I consider the construction and arrangement shown to be simple and practical.

By arranging cartridges in the same vertical plane in which they are fired, and confining them by their flanges in grooves I am enabled to control their movement into line with a barrel in a novel and convenient manner.

I claim—

1. A magazine-pistol in which the cartridges are arranged in a vertical or approximately vertical chamber, forming the handle, substantially as shown and described.

2. The vertical ratchet-bar $x$, constructed substantially as described, carrying the cartridges transversely to itself, for the purpose of effecting the movement of the cartridges to bring each into position to be fired.

3. The flange groove or grooves and friction surface or surfaces for guiding and supporting the cartridges, substantially as described.

4. In a fire-arm, a magazine provided with grooves in which a series of cartridges are guided, confined, or controlled by their flanges, substantially as described.

5. The construction and arrangement of the expanding and contracting trigger-lever, by which, as the resistance to the forward movement of the barrel increases the length of the acting arm of the lever decreases, substantially as shown and described.

HENRY F. WHEELER.

Witnesses:
GEO. H. FOX,
E. ADAMS.